(12) United States Patent
Kämmerer

(10) Patent No.: US 6,964,452 B2
(45) Date of Patent: Nov. 15, 2005

(54) VEHICLE SEAT, IN PARTICULAR AN AUTOMOBILE SEAT

(75) Inventor: Joachim Kämmerer, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/845,959

(22) Filed: May 14, 2004

(65) Prior Publication Data
US 2004/0256900 A1    Dec. 23, 2004

(30) Foreign Application Priority Data
Jun. 18, 2003    (DE) .................... 103 28 176

(51) Int. Cl.⁷ .............. A47C 1/02; B60N 2/02
(52) U.S. Cl. .......... 297/331; 297/334; 297/335; 297/336; 269/65.09
(58) Field of Search .............. 297/331, 334, 297/335, 336; 296/65.09, 65.13, 65.11

(56) References Cited

U.S. PATENT DOCUMENTS

| 4,736,985 | A |   | 4/1988  | Fourrey et al. |
|---|---|---|---|---|
| 4,880,268 | A | * | 11/1989 | Brambilla ............ 296/65.05 |
| 4,884,843 | A | * | 12/1989 | DeRees ............... 297/331 |
| 5,622,406 | A |   | 4/1997  | Meschkat et al. |
| 6,000,742 | A | * | 12/1999 | Schaefer et al. ...... 296/65.09 |
| 6,030,042 | A |   | 2/2000  | Bauer et al. |
| 6,234,574 | B1 | * | 5/2001 | Hoshihara et al. ..... 297/336 |
| 6,361,098 | B1 | * | 3/2002 | Pesta et al. ......... 296/65.03 |
| 6,595,588 | B2 |  | 7/2003 | Ellerich et al. |
| 6,601,900 | B1 | * | 8/2003 | Seibold ............... 296/65.09 |
| 6,655,738 | B2 |  | 12/2003 | Kämmerer |
| 6,729,689 | B2 | * | 5/2004 | Habedank ............. 297/335 |
| 2002/0125753 | A1 | * | 9/2002 | Kammerer ............. 297/331 |
| 2003/0001419 | A1 |  | 1/2003 | Roth et al. |
| 2003/0042771 | A1 |  | 3/2003 | Teufel et al. |

FOREIGN PATENT DOCUMENTS

| DE | 40 10 451 A1 | 10/1991 |
|---|---|---|
| DE | 44 39 975 A1 | 5/1996 |
| DE | 195 33 932 A1 | 3/1997 |
| DE | 197 58 237 A1 | 7/1998 |
| DE | 197 25 365 A1 | 12/1998 |
| DE | 198 45 772 A1 | 4/2000 |
| GB | 2 349 077 A | 10/2000 |
| JP | 55-164532 A | 12/1980 |
| WO | WO 01/19640 A2 | 3/2001 |
| WO | WO 02/22391 A1 | 3/2002 |

* cited by examiner

Primary Examiner—Peter M. Cuomo
Assistant Examiner—Sarah C. Burnham
(74) Attorney, Agent, or Firm—Womble Carlyle Sandridge & Rice, PLLC

(57) ABSTRACT

In a vehicle seat (1), in particular an automobile seat, having an understructure (3) which can be connected with the vehicle structure, and a middle structure (5) carrying a seat cushion (19) and a backrest (23), the understructure (3) and the middle structure (5) constituting two links of a first four-bar linkage (11) on either side of the vehicle seat, and the vehicle seat (1) being able to be brought from a sitting utilization position to a boarding position, the four-bar linkage (11), in order to bring the vehicle seat (1) from the utilization position to the boarding position, swings the vehicle seat (1) free as a whole, while the backrest (23) maintains its position relative to the middle structure (5).

18 Claims, 6 Drawing Sheets

VEHICLE SEAT, IN PARTICULAR AN AUTOMOBILE SEAT

BACKGROUND OF THE INVENTION

The present invention relates to a vehicle seat, in particular an automobile seat, having an understructure which can be connected to the vehicle structure, and a middle structure carrying a seat cushion and a backrest, with the understructure and the middle structure being links of a first four-bar linkage on either side of the vehicle seat, and the vehicle seat being convertible from a sitting utilization position to a boarding position.

In a known vehicle seat of the type described above, the change to the boarding position is effected by swinging the backrest free relative to the middle structure and by sliding the longitudinally adjustable vehicle seat as a whole into the front-most longitudinal position of the seat. The four-bar linkage, for example, serves to adjust the height or to bring the seat into a level position close to the floor.

BRIEF SUMMARY OF SOME ASPECTS OF THE INVENTION

The present invention is based on the object of improving a vehicle seat of the type mentioned above. In accordance with one aspect of the present invention, this object is achieved through a vehicle seat, in particular an automobile seat, having an understructure which can be connected to the vehicle structure, and a middle structure carrying a seat cushion and a backrest, with the understructure and the middle structure being links of a first four-bar linkage on either side of the vehicle seat, and the vehicle seat being convertible from a sitting utilization position to a boarding position, characterized in that for changing the vehicle seat from the utilization position to the boarding position, the four-bar linkage swings the vehicle seat free as a whole, while the backrest maintains its configuration relative to the middle structure.

The term "boarding position" refers to a position of the vehicle seat in which at least the backrest is inclined frontward (instead of backward) relative to the vertical position, but in which preferably the entire vehicle seat is shifted frontward. Preference is given to an easy and quick sliding action providing good access to the rear seat row rather than a space-saving end position.

When, in order to change the vehicle seat from the utilization position to the boarding position, the four-bar linkage swings the vehicle seat free as a whole, while the backrest maintains its configuration relative to the middle structure, there is no need for a longitudinal adjustment and backrest adjustment with a memory function, which would otherwise be necessary for finding the pre-set utilization position when returning from the boarding position. Nor is it necessary to coordinate two movements. Both measures reduce the production input and thus the costs. Finding the initial position of the four-bar linkage is simpler compared with finding the longitudinal position of the seat and the inclination of the backrest, especially if the four-bar linkage has no other function, i.e. it is locked under normal conditions and can preferably be unlocked only for bringing the vehicle seat into the boarding position. For locking the four-bar linkage, a lock and a corresponding counter element are preferably installed between two links, for example between the understructure and the middle structure. The two other links of the four-bar linkage are preferably two pivotable supports which are, for example, arranged opposite each other.

Although the backrest does not need to be pivotable for being brought into the boarding position, it is advantageous to have a backrest that can be pivoted and locked relative to the middle structure, in order be able to set the inclination of the backrest individually for greater comfort and, for example, to change the vehicle seat from the utilization position to a flat floor position, for which the backrest is pivoted forward.

"Flat floor position" refers to a position of the vehicle seat in which at least the backrest is inclined forward at least approximately into a horizontal position (e.g., so that the backrest is in opposing face-to-face relation with the seat cushion) and, preferably, the seat cushion is also lowered or folded away to provide storage space for the backrest. Preference is given to a space-saving, flat end position over a simple and quick changing action.

A flat floor position, which is extremely flat, i.e. low, can be reached if the seat cushion and the middle structure constitute two links of a second four-bar linkage conceived to lower the seat toward the floor relative to the middle structure when the vehicle seat is brought into the flat floor position, i.e. if, by a more efficient use of space, the height of the vehicle seat is reduced as well. A section of the backrest and a third pivotable support preferably constitute the two other links of the second four-bar linkage.

Although the vehicle seat does not need to be longitudinally adjustable to assure the change to the boarding position, it is an advantage if the vehicle seat can be changed to another longitudinal position of the seat in order to set the longitudinal position of the seat individually for greater comport and, for example, to achieve an even more frontward position of the vehicle seat when changing into the boarding position. Preferably, for longitudinal adjustment, the middle structure or the understructure on either side of the vehicle seat is a pair of rails having two rails which can be locked with one another and which can be unlocked and slid relative to one another for changing the vehicle seat to another longitudinal position of the seat.

BRIEF DESCRIPTION OF THE DRAWINGS

The invention is explained in greater detail below by means of three exemplary embodiments illustrated in the drawing, in which.

DETAILED DESCRIPTION OF THE INVENTION

Figure 1:
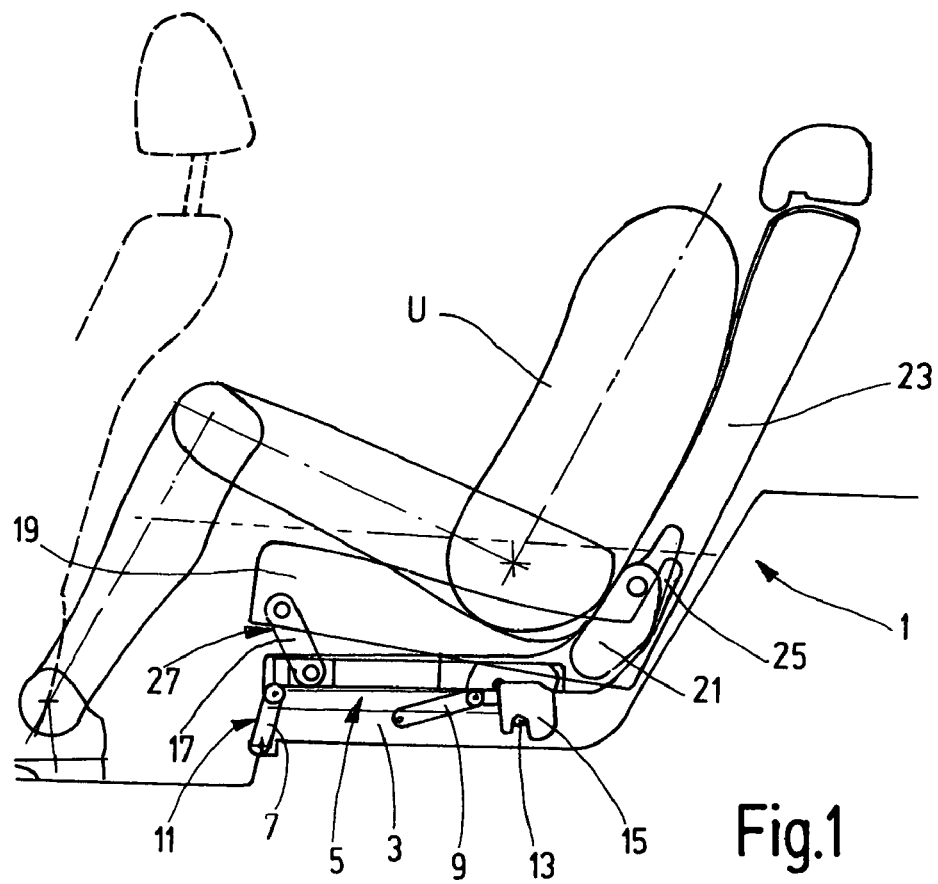
FIG. 1 is a schematic lateral view of the first exemplary embodiment in the design position, FIG. 2 a view corresponding to FIG. 1 in another longitudinal position of the seat, FIG. 3 a view corresponding to FIG. 1 in the flat floor position, FIG. 4 a view corresponding to FIG. 1 in the boarding position, FIG. 5 a schematic lateral view of the second exemplary embodiment in the design position, FIG. 6 a view corresponding to FIG. 5 in another longitudinal position of the seat, FIG. 7 a view corresponding to FIG. 5 in the flat floor position, FIG. 8 a view corresponding to FIG. 5 in the boarding position, FIG. 9 a schematic lateral view of the third exemplary embodiment in the design position, FIG. 10 a view corresponding to FIG. 9 in the flat floor position, and FIG. 11 a view corresponding to FIG. 9 in the boarding position.
Figure 2:
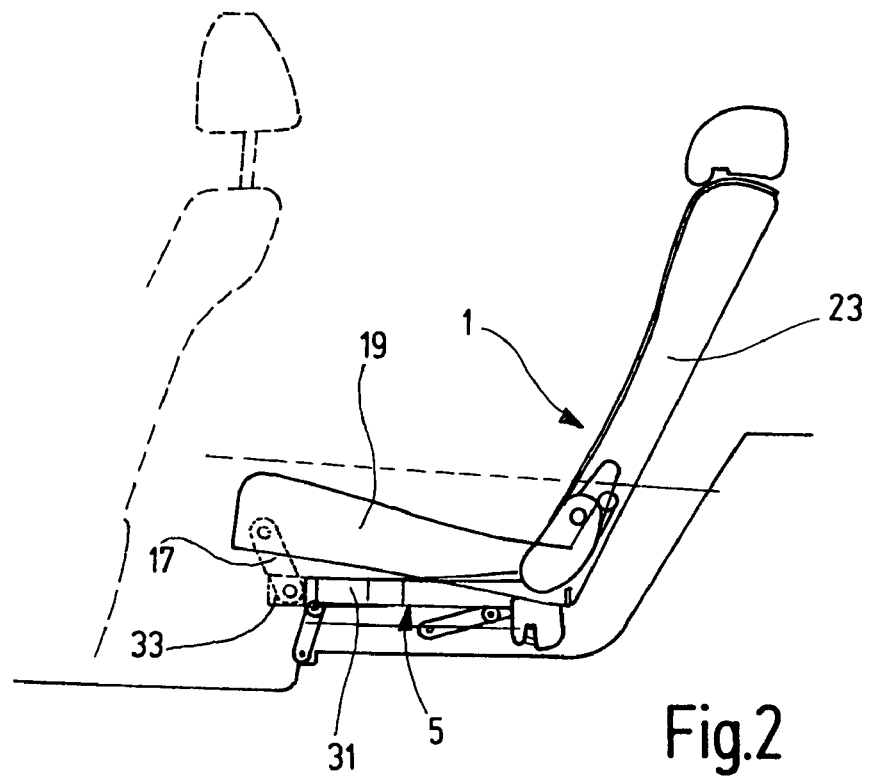
Figure 3:
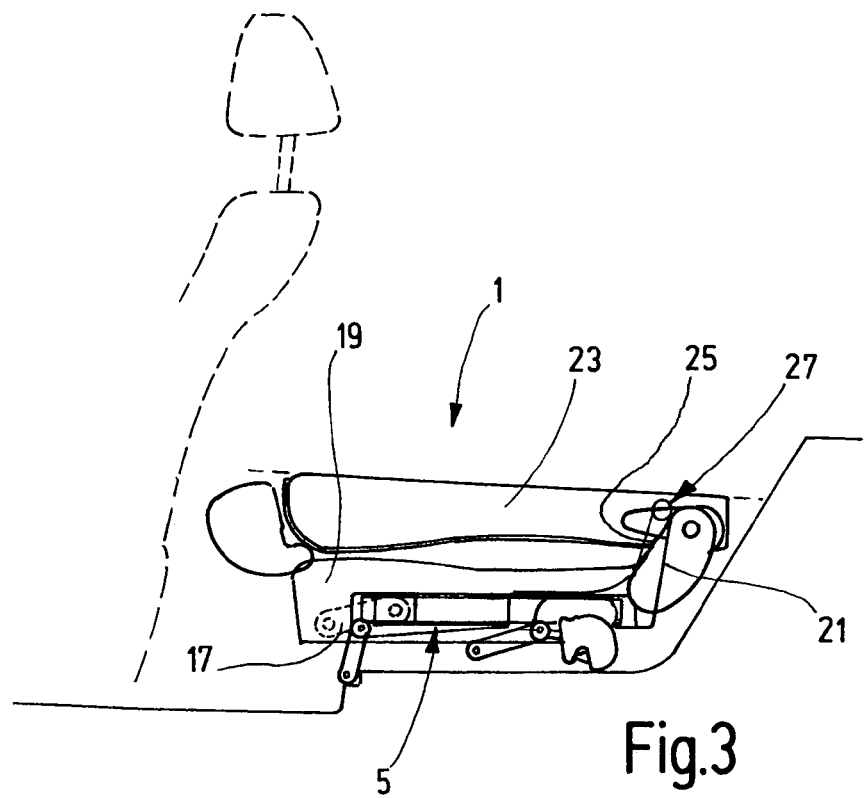
Figure 4:
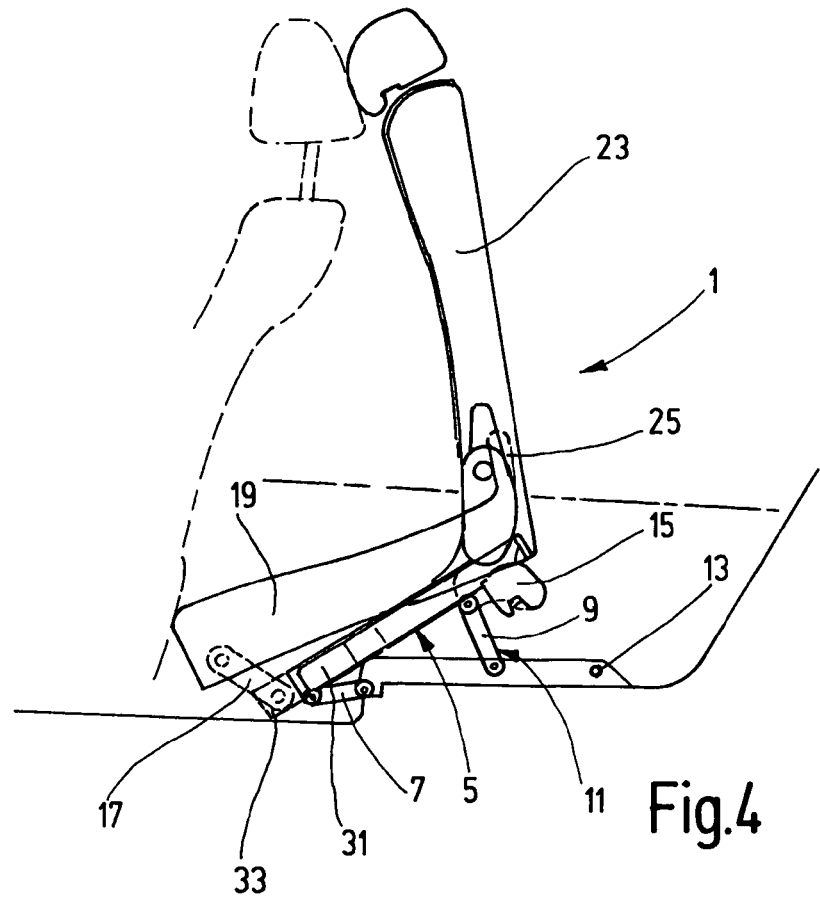
Figure 5:
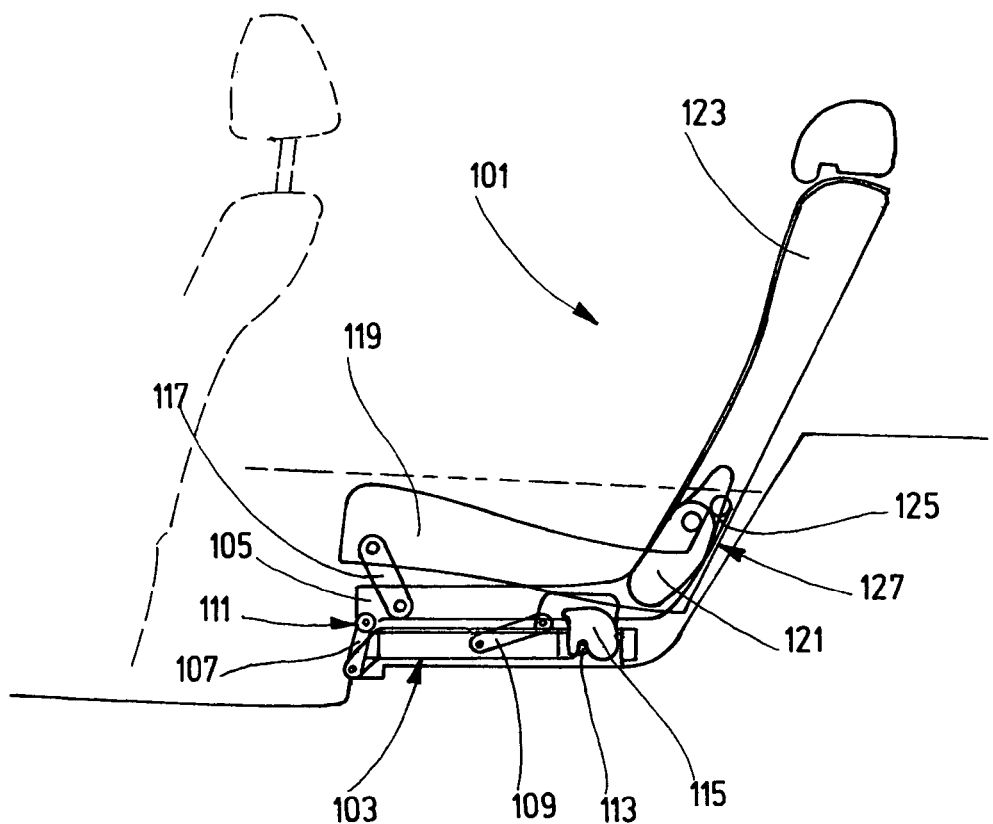
Figure 6:
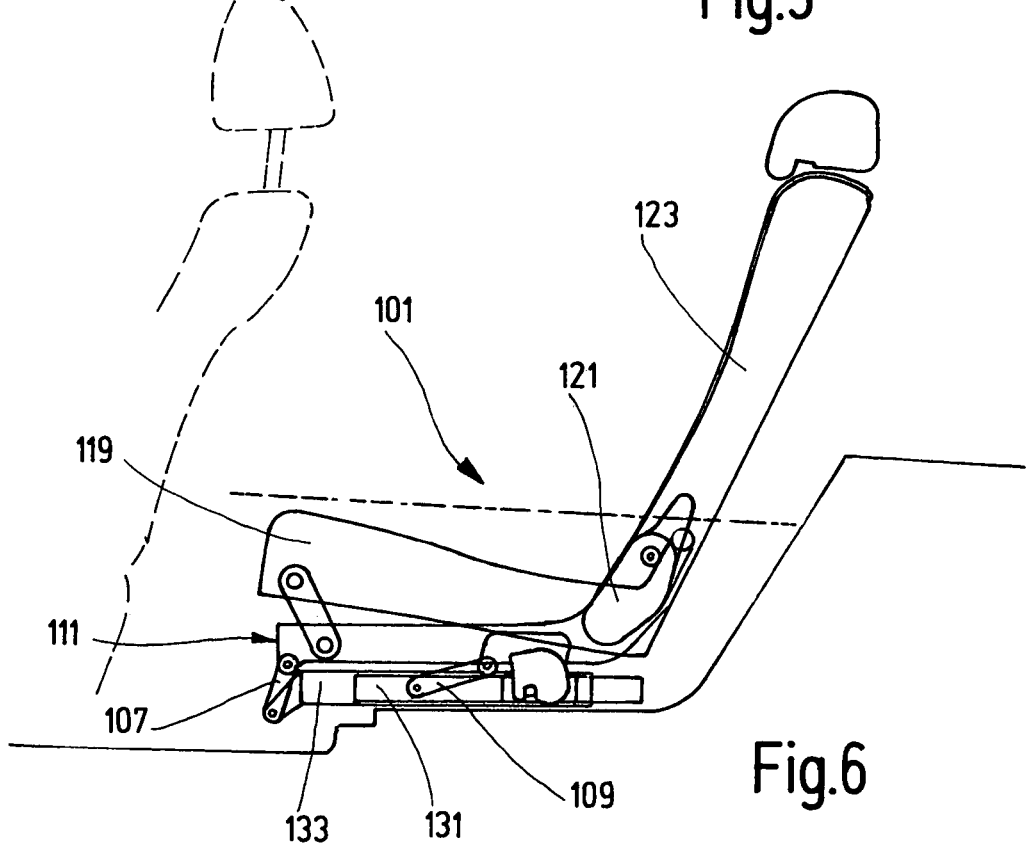
Figure 7:
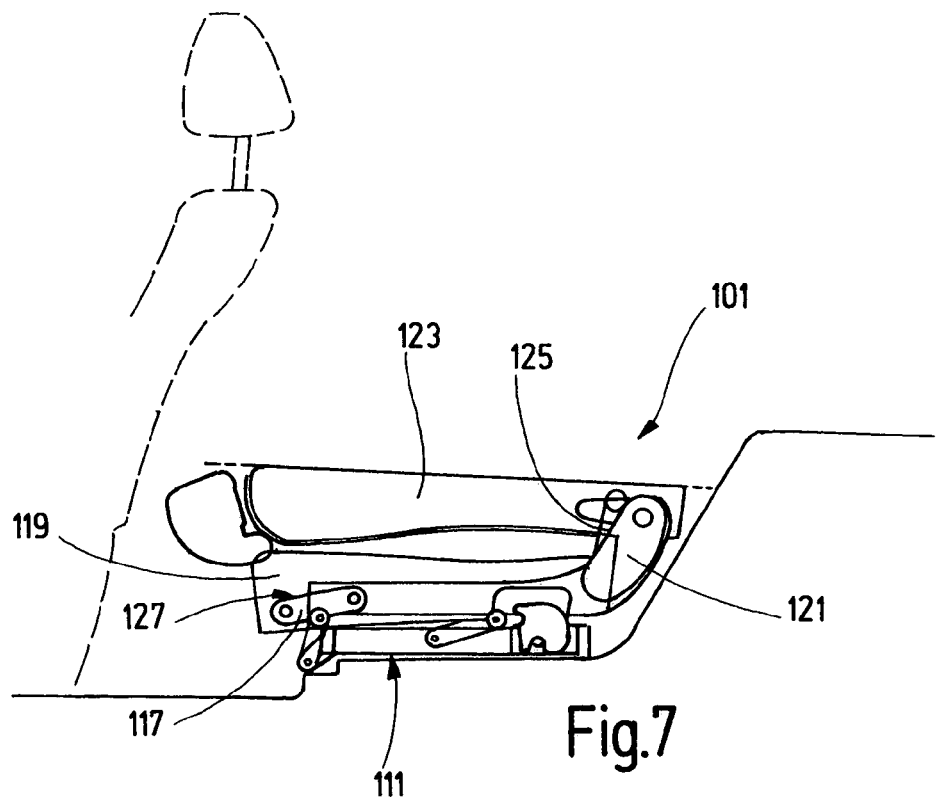
Figure 8:
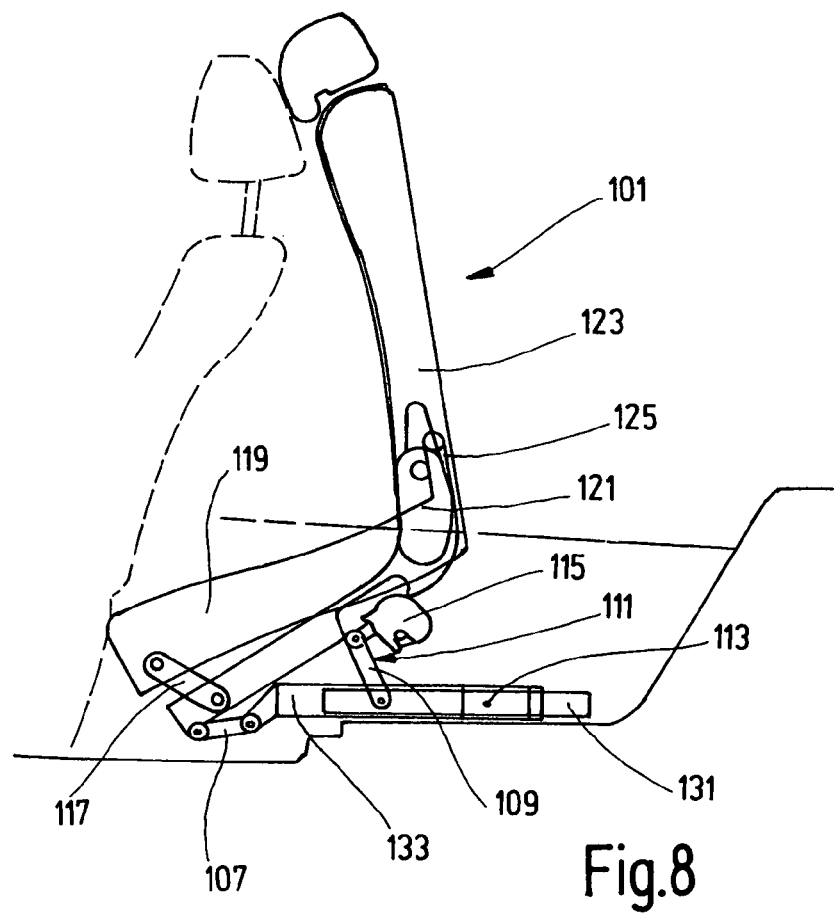
Figure 9:
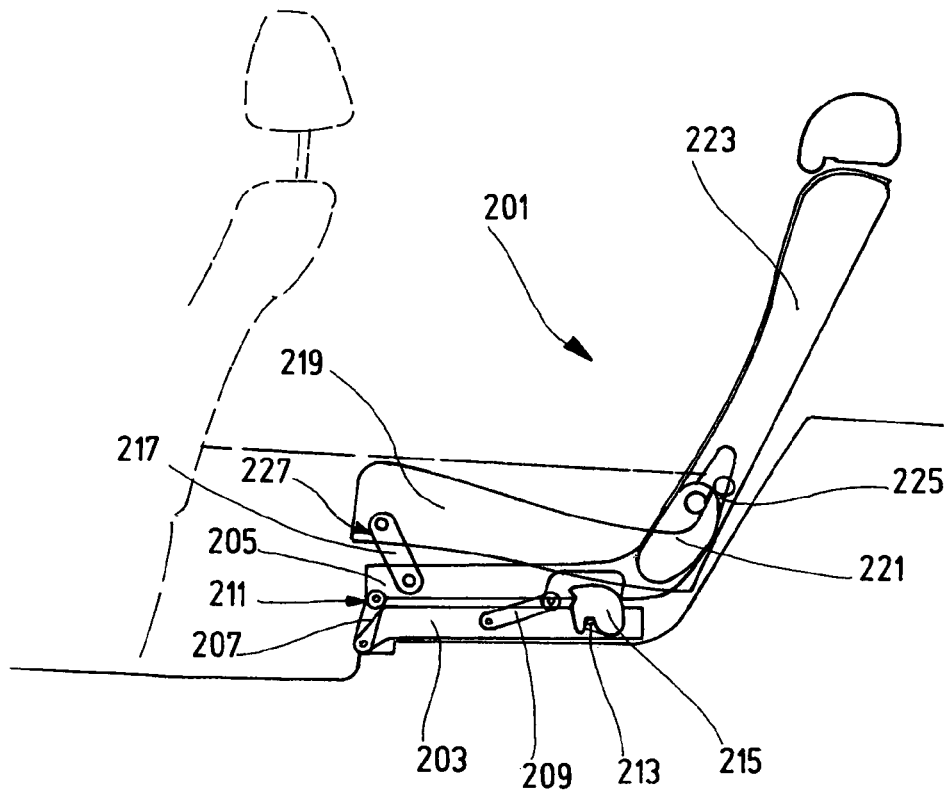
Figure 10:
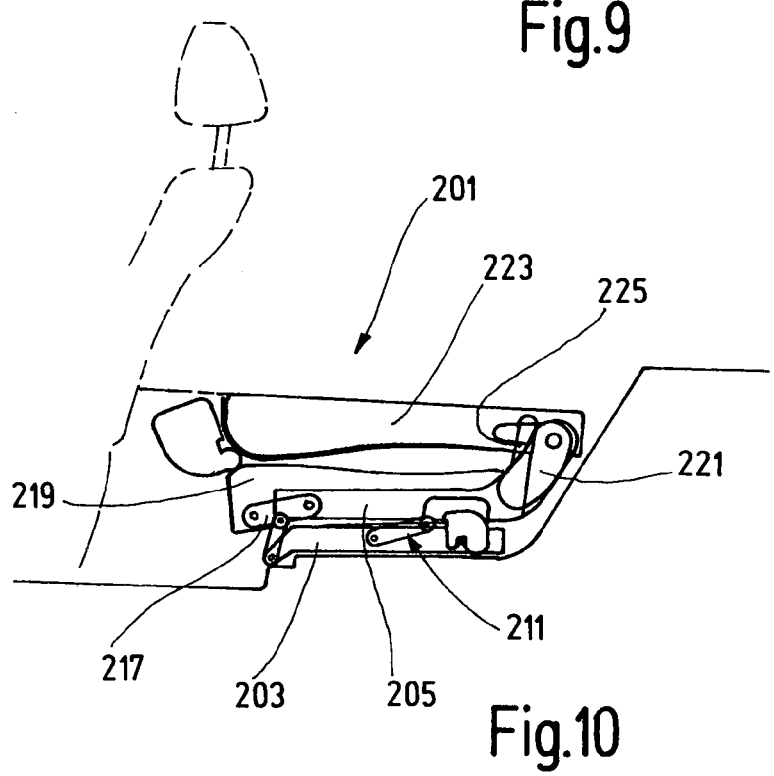
Figure 11:
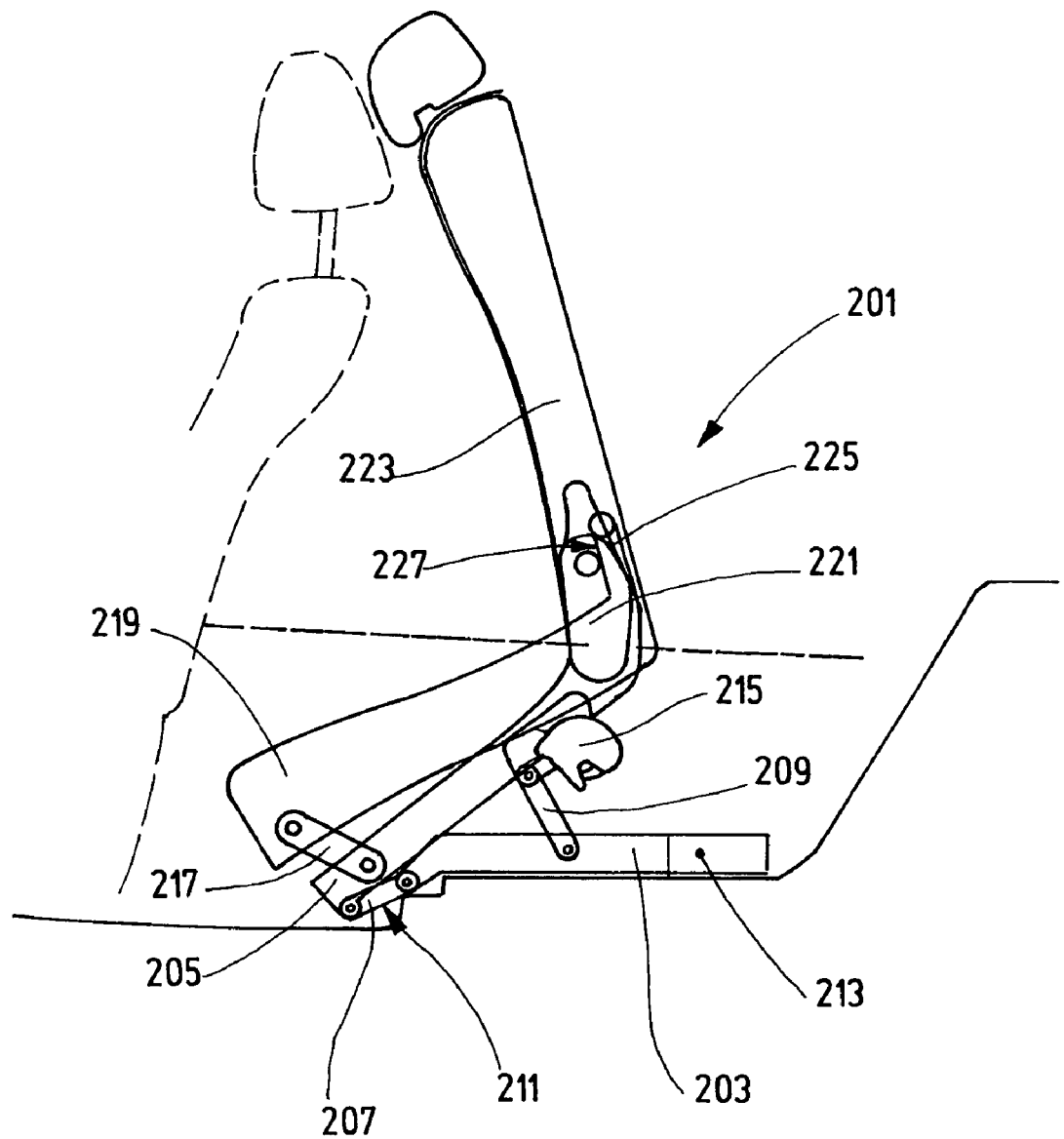

The present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In the first exemplary embodiment, there is a vehicle seat 1 for a rear seat row of an automobile, in particular for the second seat row of a van. The arrangement of the vehicle seat 1 inside the automobile and the automobile's usual direction of travel determine the direction indications below. On either side of the vehicle seat, the vehicle seat 1 has an understructure 3 connected with the vehicle structure, and a middle structure 5 that is pivotably linked in the front of the understructure 3 by means of a first pivotable support 7 and, approximately in the middle, by means of a second pivotable support 9, so that the understructure 3, the two pivotable supports 7 and 9, and the middle structure 5 are links of a first four-bar linkage 11. At the rear end of the understructure 3 there is a bolt 13. A lock 15 at the rear end of the middle structure 5 locks the vehicle seat 1 with the bolt 13 in a position that is suitable for accommodating the user U, thereby locking the first four-bar linkage 11.

A frontal corner of a seat cushion 19 is pivotably linked by means of a third pivotable support 17 to the frontal end of the middle structure 5. The term "seat cushion" refers to the entire component, including the structure (frame) of the seat cushion 19 and its upholstery. An inclinable fitting 21 is mounted at the rear end of the middle structure 5, bearing respectively one side of a backrest 23 and defining the pivoting axis of the backrest. An arm 25 is pivotably linked to the backrest 23 and is fixedly mounted to the rear end of the seat cushion 19. The third pivotable support 17, the seat cushion 19 including the arm 25, the backrest section between the area where the arm 25 is pivotably linked and the pivoting axis of the backrest, and the middle structure 5 are links of a second four-bar linkage 27. The entire vehicle seat 1 is essentially constructed symmetrically relative to a vertical middle level, the axes of the different linkage points on the two sides of the vehicle seat being aligned with one another.

In the present first exemplary embodiment, the middle structure 5 is in the form of a pair of lateral rails, i.e. it has an exterior rail 31 and an inner rail 33 that can be slid and locked relative to one another in a longitudinal direction. The first pivotable support 7 is pivotably linked and the lock 15 is firmly attached to the inner rail 31 by means of an adapter, to which the second pivotable support 9 is linked as well. The third pivotable support 17, the seat cushion 19 and the fitting 21 are pivotably linked or firmly attached to the outer rail 33. Optionally, the rails 31 and 33 on both sides of the seat cushion can be connected with one another, each forming a frame.

With the function of the longitudinal adjuster of the middle structure 5, i.e. by unlocking and sliding the outer rail 33 relative to the inner rail 31, it is possible to adjust the longitudinal position of the seat cushion 1, i.e. starting from a utilization position, for example the design position, the seat cushion 19 and the backrest 23 are slid together in a longitudinal direction, the rails 31 and 33 being locked again in the new utilization position.

In addition, the vehicle seat 1 can be brought into a flat floor position in order to increase the storage space. For this, starting from a utilization position, preferably the design position, the backrest 23 is folded forward into a horizontal table position (e.g., so that the backrest 23 is in opposing face-to-face relation with the seat cushion 19) by means of the fitting 21, whereby, through an automatic movement of the second four-bar linkage 27 in which the third pivotable support 17 is folded frontward, the seat cushion 19 is lowered relative to the middle structure 5 toward the front.

Finally, the vehicle seat 1 can be brought into a boarding position for better access to the rear seat row. For this, starting from a utilization position, preferably the design position, the vehicle seat 1 is first brought into its most frontward longitudinal position of the seat, then the lock 15 is opened, so that the lock 15 can release itself from the bolt 13, thereby unlocking the first four-bar linkage 11. By lowering the first pivotable support 7 and pivoting the second pivotable support 9 forward, the entire vehicle seat 1 swings free, in particular the middle structure 5 carrying the backrest 23 with it is folded forward to a slanted position, with the frontal edge of the middle structure 5 pivoting forward and downward. With this, any extra swinging-free of the backrest 23 is no longer needed; rather, it maintains its configuration relative to the middle structure 5.

The second exemplary embodiment is largely similar to the first exemplary embodiment. For this reason, identical components or components having identical functions have reference signs that are increased by 100. In this vehicle seat 101, the understructure 103 and the middle structure 105 are modified in the way described below, the first pivotable support 107, the second pivotable support 109, the bolt 113, the lock 115, the third pivotable support 117, the seat cushion 119, the fitting 121, the backrest 123 and the arm 125 correspond to the respective components of the first exemplary embodiment, with a first four-bar linkage 111 and a second four-bar linkage 127 being defined in the same manner. In this case, the understructure 103 is in the form of a pair of rails, the inner rail 131 being connected with the vehicle structure, while the pivotable supports 107 and 109 are pivotably linked and the bolt 113 is firmly attached to the outer rail 133. The middle structure 105 is constructed correspondingly in one piece.

For longitudinal adjustment, i.e. for changing the longitudinal position of the seat, the outer rail 133 is unlocked and slid, taking with it, without any change, the first four-bar linkage 111 and the middle structure 105, including superstructures. For reaching the flat floor position, the backrest 123 is folded forward, as in the first exemplary embodiment, and the seat cushion 119 is lowered relative to the middle structure 105 by means of the second four-bar linkage 127. To change to the boarding position, the vehicle seat 101, as in the first exemplary embodiment, is brought into the front-most longitudinal position of the seat, then the lock 115 is unlocked and the entire vehicle seat 101 is swung free by a movement of the first four-bar linkage 111, without any extra swinging-free of the backrest 123.

The third exemplary embodiment is largely similar to the two other exemplary embodiments. For this reason, identical components or components having identical functions have reference signs that are increased by 200 or 100. In this vehicle seat 201, the understructure 203 is similar to that of the first exemplary embodiment, while the middle structure 205 is similar to that of the second exemplary embodiment. The first pivotable support 207, the second pivotable support 209, the bolt 213, the lock 215, the third pivotable support 217, the seat cushion 219, the fitting 221, the backrest 223 and the arm 225 correspond to the respective components of the two other exemplary embodiments, a first four-bar linkage 211 and a second four-bar linkage 227 being defined in the same manner.

There is no longitudinal adjustment. To bring the seat into the flat floor position, the backrest 223 is folded forward as in the two other exemplary embodiments, and the seat cushion 219 is lowered relative to the middle structure 205 by means of the second four-bar linkage 227. To change to the boarding position, the lock 215, as in the first exemplary embodiment, is unlocked and the entire vehicle seat 201 is swung free by a movement of the first four-bar linkage 211, without any extra swinging-free of the backrest 223.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vehicle seat for being attached to a vehicle structure and sat in by a user, the vehicle seat comprising:
    a first four-bar linkage, wherein first and second linkages of the first four-bar linkage are respectively
        (a) an understructure of the vehicle seat, wherein the understructure is for being connected to the vehicle structure, and
        (b) a middle structure of the vehicle seat;
    a seat cushion carried by the middle structure; and
    a backrest that extends upwardly from proximate the seat cushion while the vehicle seat is in a utilization position in which the user can sit in the vehicle seat,
    wherein the first four-bar linkage is operative so that the vehicle seat can be pivoted substantially as a whole from the utilization position to a boarding position, and while the vehicle seat is pivoted substantially as a whole from the utilization position to the boarding position simultaneously both
        (a) the backrest's configuration relative to the middle structure is maintained, and
        (b) the backrest's inclination relative to the vehicle structure changes,
    wherein the backrest is inclined forwardly, so that an upper portion of the backrest is positioned forward of a lower portion of the backrest, during the boarding position, and
    wherein the seat cushion and the middle structure respectively are first and second links of a second four-bar linkage of the vehicle seat, and the second four-bar linkage is operative so that the seat cushion is lowered relative to the middle structure while the vehicle seat is converted from the utilization position to a flat floor position.

2. The vehicle seat according to claim 1, wherein the first four-bar linkage is locked in the utilization position and can be unlocked for allowing the vehicle seat to be pivoted into the boarding position.

3. The vehicle seat according to claim 1, further comprising a lock mounted for locking the understructure and the middle structure together in the utilization position, and the lock can be unlocked for allowing the vehicle seat to be pivoted into the boarding position.

4. The vehicle seat according to claim 1, wherein third and fourth linkages of the first four-bar linkage respectively are a first pivotable support and a second pivotable support of the vehicle seat.

5. The vehicle seat according to claim 1, wherein the backrest is mounted for being pivoted and locked relative to the middle structure.

6. The vehicle seat according to claim 5, wherein the vehicle seat is operative so that the backrest is pivoted forwardly while the vehicle seat is converted from the utilization position to the flat floor position.

7. The vehicle seat according to claim 5, wherein third and fourth linkages of the second four-bar linkage respectively are a section of the backrest and a third pivotable support.

8. The vehicle seat according to claim 1, wherein the vehicle seat is operative so that the vehicle seat, substantially as a whole, can be translationally moved, relative to the vehicle structure, forwardly and rearwardly between longitudinal positions while at least part of the understructure is immovably mounted to the vehicle structure.

9. The vehicle seat according to claim 1, wherein an element, which is selected from the group consisting of the middle structure and the understructure, includes a pair of rails that can be slid relative to one another so that the vehicle seat, substantially as a whole, can be translationally moved, relative to the vehicle structure, forwardly and rearwardly between longitudinal positions while at least part of the understructure is immovably mounted to the vehicle structure.

10. The vehicle seat according to claim 2, wherein third and fourth linkages of the first four-bar linkage respectively are a first pivotable support and a second pivotable support of the vehicle seat, and each of the first pivotable support and the second pivotable support is pivotably mounted to both the understructure and the middle structure.

11. The vehicle seat according to claim 2, wherein the backrest is mounted for being pivoted and locked relative to the middle structure.

12. The vehicle seat according to claim 11, wherein the vehicle seat is operative so that the backrest is pivoted forwardly while the vehicle seat is converted from the utilization position to the flat floor position, so that the backrest is in opposing face-to-face relation with the seat cushion while the vehicle seat is in the flat floor position.

13. The vehicle seat according to claim 12, wherein third and fourth linkages of the second four-bar linkage respectively are a section of the backrest and a third pivotable support.

14. The vehicle seat according to claim 2, wherein the vehicle seat is operative so that the vehicle seat, substantially as a whole, can be translationally moved, relative to the vehicle structure, forwardly and rearwardly between longitudinal positions while at least part of the understructure is immovably mounted to the vehicle structure.

15. The vehicle seat according to claim 7, wherein an element, which is selected from the group consisting of the middle structure and the understructure, includes a pair of rails that can be slid relative to one another so that the vehicle seat, substantially as a whole, can be translationally moved, relative to the vehicle structure, forwardly and rearwardly between longitudinal positions while at least part of the understructure is immovably mounted to the vehicle structure.

16. The vehicle seat according to claim 1, wherein both the seat cushion's configuration with respect to the understructure, and the middle structure's configuration with respect to the understructure, change while the vehicle seat is pivoted substantially as a whole from the utilization position to the boarding position.

17. The vehicle seat according to claim 4, wherein each of the first pivotable support and the second pivotable support is pivotably mounted to both the understructure and the middle structure.

18. The vehicle seat according to claim 1, wherein:
third and fourth linkages of the first four-bar linkage respectively are a first pivotable support and a second pivotable support of the vehicle seat,
each of the first pivotable support and the second pivotable support is pivotably mounted to both the understructure and the middle structure,
third and fourth linkages of the second four-bar linkage respectively are a section of the backrest and a third pivotable support, and
the third pivotable support is pivotably mounted to both the middle structure and the seat cushion.

* * * * *